United States Patent [19]

Onuma et al.

[11] 4,189,724
[45] Feb. 19, 1980

[54] ELECTRIC RESTRICTION INDICATOR WITH A CONTACTLESS SWITCH DEVICE FOR INDICATING A RESTRICTION IN FILTER ELEMENTS

[75] Inventors: Minoru Onuma, Tokyo; Masayoshi Nakamura, Tachikawa; Takao Yamazaki; Tatsuo Ohta, both of Tokyo, all of Japan

[73] Assignee: Donaldson Company, Inc., Minneapolis, Minn.

[21] Appl. No.: 880,753

[22] Filed: Feb. 24, 1978

[51] Int. Cl.² .................................. G08B 21/00
[52] U.S. Cl. ............................. 340/607; 116/264
[58] Field of Search ............ 340/607, 608; 200/308, 200/310; 116/114 PV, 117

[56] References Cited

U.S. PATENT DOCUMENTS

| | | | |
|---|---|---|---|
| 3,368,520 | 2/1968 | DeMan et al. | 116/117 R |
| 3,443,365 | 5/1969 | Lee et al. | 55/274 |
| 3,465,707 | 9/1969 | Kashiwaba | 116/114 PV |
| 3,484,772 | 12/1969 | Niewyk et al. | 340/607 |
| 3,963,891 | 6/1976 | DeMagondeaux | 340/607 |
| 4,014,209 | 3/1977 | Emerick | 116/117 R |

Primary Examiner—Alvin H. Waring
Attorney, Agent, or Firm—Merchant, Gould, Smith, Edell, Welter & Schmidt

[57] ABSTRACT

A restriction indicator having a contactless switch device for indicating a restriction in filter elements of fluid filters having an intake side and a negative pressure side. The restriction indicator includes a photointerrupter having a light emitting device and a light receiving device. The light receiving device provides an electrical signal indicative of increased negative pressure in the negative pressure side.

15 Claims, 12 Drawing Figures

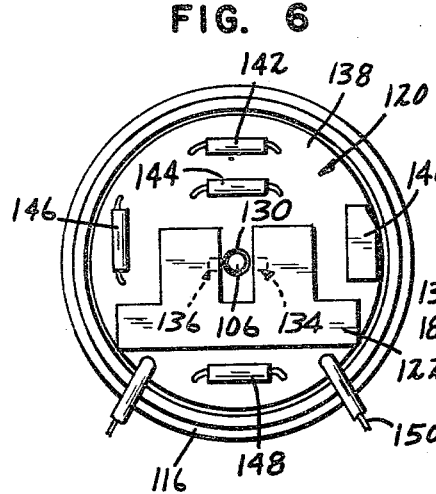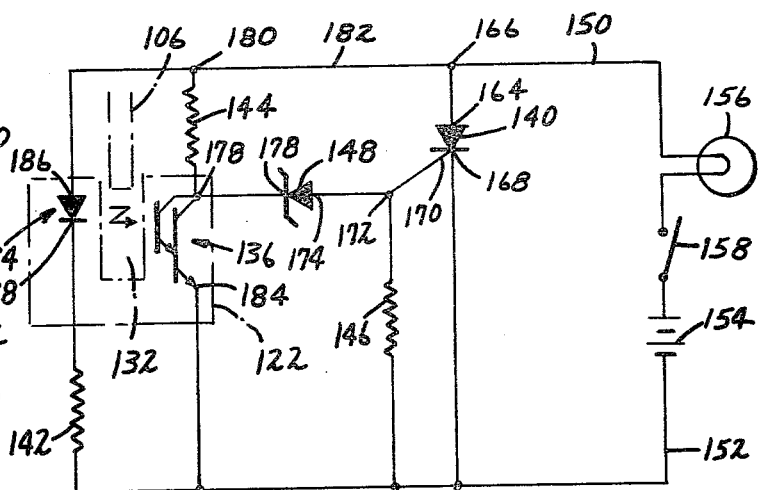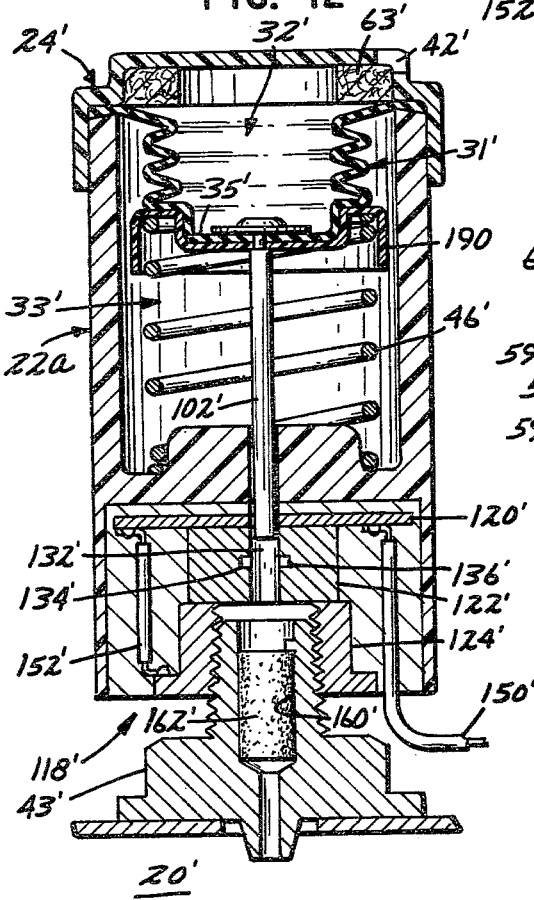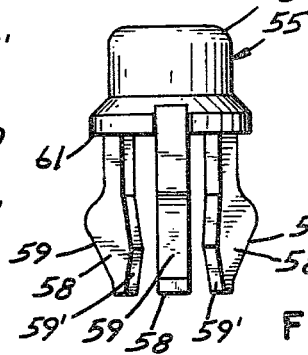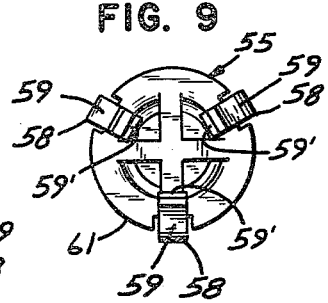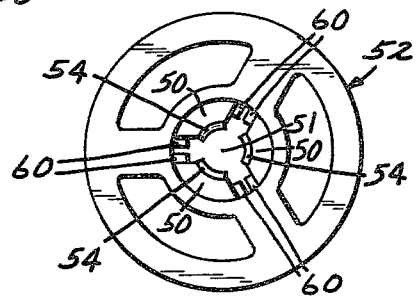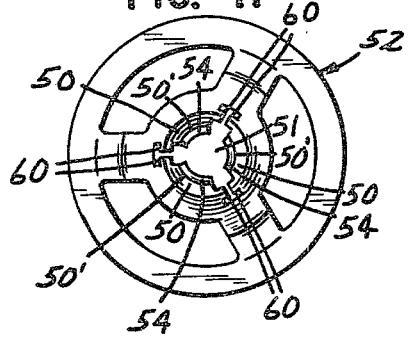

ELECTRIC RESTRICTION INDICATOR WITH A CONTACTLESS SWITCH DEVICE FOR INDICATING A RESTRICTION IN FILTER ELEMENTS

BACKGROUND OF THE INVENTION

The present invention relates generally to restriction indicator devices for automatically detecting and indicating a restriction in filter elements of fluid filters having an intake side and a negative pressure side. More particularly, the present invention relates to a restriction indicator having means for generating an electrical alarm signal in response to an undesirable restriction in the filter element of a fluid filter.

The present invention is an improvement of two prior art restriction indicators. One such prior art restriction indicator is disclosed in U.S. Pat. No. 3,443,365 which is assigned to the assignee of the present invention. This U.S. patent discloses a restriction indicator in which a movable colored signal element is visible through a window portion in the housing of the device when an undesirable restriction occurs. Generally, the subject patent discloses a device having a housing with a transparent wall and which is divided into first and second pressure chambers by a flexible bellows-type diaphragm disposed therein. The first chamber is in fluid communication with the atmosphere while the second chamber is in fluid communication with the negative pressure side of the fluid filter. A spring biases the diaphragm to which the colored signal element is secured to a normal position wherein the colored signal element is not visible through the wall of the housing. Upon increased negative pressure within the second chamber, the bellows diaphragm expands against the spring biasing force such that the colored signal element becomes visible through the housing wall. Means are provided for releasably retaining the diaphragm in the extended or expanded position until the diaphragm may be manually released. The restriction indicator may be mounted on a vehicle instrument panel and communicates with the negative pressure side of the fluid filter through a conduit such as a rubber hose. In such situations, however, consideration must be given to the conduit curvature to reduce air flow resistance and the indicating device should be mounted on a supporting means to cancel the vibration between the vehicle body and the engine. Moreover, connecting means must typically be provided to prevent leakage at the rubber hose connections.

An improved restriction indicator has been disclosed in Japanese utility model Registration No. 90913/75 wherein an electrical signal transmitting means including mechanical make or break contacts are incorporated into the restriction indicator disclosed in the above-mentioned U.S. patent. A visual indicator or alarm means, for example, a display lamp, is mounted on the vehicle instrument panel and connected to the electrical signal transmitting means. The improved restriction indicator includes a switch rod mounted for reciprocating movement in response to the expansion or retraction of a flexible bellows-like diaphragm. A fixed contact is mounted on a fitting for attaching the restriction indicator to an outlet conduit and a movable contact is mounted on the switch rod so that when the switch rod is lowered the contacts are closed whereby the display lamp or arm means is actuated through a suitable electric circuit. In some applications, however, such as large construction machines subject to violent vibration, the mechanical contacts may inadvertently make or break. Thus, an alarm signal may be interrupted or an inaccurate alarm signal generated.

The present invention is an improvement over the two prior art devices discussed above in that it is a restriction indicator providing a reliable and accurate electrical signal utilizing a photointerrupter device. Mechanical contacts are thus eliminated in the present invention thereby insuring that the restriction indicator is substantially unaffected by vehicle or engine vibration.

SUMMARY OF THE INVENTION

The present invention is a restriction indicator for fluid filters having an intake side and a negative pressure side and includes a housing having top and bottom ends and a peripheral wall therebetween. A flexible bellows-like diaphragm member is affixed within the housing dividing the interior of the housing into first and second pressure chambers. The first pressure chamber is in fluid communication with the atmosphere through an aperture in the top end of the housing and the second pressure chamber is in fluid communication with the negative pressure side of the fluid filter through an aperture in the bottom end of the housing. Spring means are provided for biasing the diaphragm toward the top end of the housing and electrical signal means are provided for indicating increased negative pressure within the second pressure chamber. The electrical signal indicating means includes a photointerrupter affixed to the housing at the bottom end thereof and having an axial passageway therethrough. A light receiver means and a light generating means are disposed at diametrically opposed positions about the axial passageway so that light generated by the light generating means is transmitted across the axial passageway and is detected by the light receiving means. A rod is disposed for axial reciprocating movement within said axial passageway to selectively interrupt the transmission of light across the axial passageway. Means are provided for biasing the rod toward a first axial position wherein the light transmission is not interrupted and further means are provided for transmitting the downward or extended movement of the diaphragm to the rod whereby the rod is disposed in a second position interrupting the transmission of light. Finally, electric circuit means is connected to light transmitting means and the light receiving means to provide an electrical signal corresponding to the presence or absence of increased negative pressure within the negative pressure chamber.

In one embodiment of the present invention, the rod is independently mounted from the diaphragm and has a first end that extends into the second pressure chamber. The first end of the rod is selectively engaged by a contact surface provided on the diaphragm to position the rod in the light interrupting position. In an alternative embodiment, the rod is affixed to the diaphragm and mounted for axial reciprocal movement therewith. In each embodiment, the light transmitting element is preferably a light emitting diode and the light receiving element is preferably a device having a collector and an emitter wherein the collector to emitter resistance is dependent upon the presence or absence of light impinging on the device. The circuit means further comprises a source of power and an indicating device connected in series between positive and negative lead conductors. The light emitting diode has its anode connected to the positive lead conductor and its cathode connected to the negative lead conductor. The collector of the light receiving device is connected to the positive lead conductor and the emitter of the light receiving device is connected to the negative lead conductor. A thyristor has an anode connected to the positive lead conductor, a cathode connected to the negative lead conductor and a gate. A zener diode is connected between the gate and the collector of the light receiving device, the anode of the zener diode being connected to the gate and the cathode being connected to the collector. Upon light interruption by the rod, the collector to emitter resistance increases significantly resulting in voltage output signal at the collector which causes avalanche breakdown of the zener diode thereby causing sufficient gate current flow to turn on the thyristor. Adequate current then flows through the indicating device which may be a light mounted in the vehicle instrument panel and/or an alarm buzzer.

Each embodiment of the present invention may also be provided with a means within the first pressure chamber for releasably retaining the diaphragm in an extended position until the restriction indicator may be manually reset.

The restriction indicator of the present invention, therefore, provides a reliable and accurate electrical signal indicative of increased negative pressure at the negative pressure side of a fluid filter element. The restriction indicator of the present invention is substantially vibration immune. These and other advantages of the present invention will become apparent with reference to the accompanying drawings, detailed description of the preferred embodiment, and the claims.

BRIEF DESCRIPTION OF THE DRAWINGS

FIG. 6 is a plan view of a printed circuit board showing a photointerrupter mounted thereon;

FIG. 7 is a schematic diagram of the electrical circuit incorporated in the present invention;

FIG. 8 is an enlarged view in side elevation of the release button of the structure of FIG. 2;

FIG. 9 is a view in bottom plan of the structure of FIG. 8;

FIG. 10 is an enlarged view in top plan of the guide element and supporting spider of the structure of FIG. 2;

FIG. 11 is a view in bottom plan of the structure of FIG. 9;

FIG. 12 is an enlarged view in vertical section similar to FIG. 2 showing an alternative embodiment of the present invention.

DETAILED DESCRIPTION OF THE PREFERRED EMBODIMENT

Figure 1:
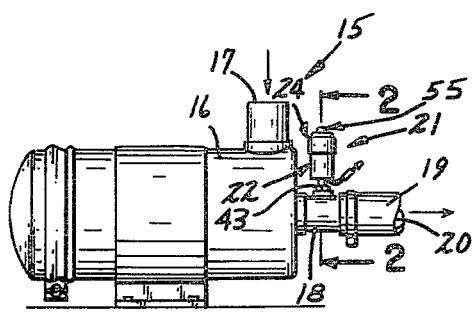
FIG. 1 is a view and side elevation of an air filter device showing the improved restriction indicator of the present invention mounted thereon.

Referring to the drawings, wherein like numerals represent like parts throughout the several views, FIG. 1 shows a conventional air filter 15 having a housing 16 which is provided with a fresh air intake 17 and a filtered air outlet 18. Outlet 18 is sized to be connected to the air intake of a suction device such as a conventional internal combustion engine (not shown) by means of a tubular member 19. Outlet 18 and tubular member 19 cooperate to define a negative pressure chamber 20 between filter 15 and the internal combustion engine.

In filter systems where the present invention is utilized, and particularly in filter systems which are required to operate in areas where there is a high degree of contaminants in the air passing through filter 15, it is necessary to clean or replace the filter element (not shown) within housing 16 at frequent intervals to assure the economical and trouble-free operation of the engine or device on which filter 15 is mounted.

To provide adequate warning of the need for such cleaning or replacement of filter parts, a restriction indicator designated generally as 21 is provided. Restriction indicator 21 includes a tubular casing 22 having a side wall 22'. Tubular casing 22 has an open end 25 which is closed by a cap member 24. Cap 24 has a top wall 27 and an annular skirt 28 which encloses the upper portion of casing wall 22'. In the preferred embodiment, casing 22 is formed of a transparent plastic material and cap 24 is formed of an opaque plastic material. A wall portion 23 is positioned along a central longitudinal axis of tubular casing 22 intermediate open end 25 and a closed end 25'. Tubular casing 22 and intermediate wall portion 23 in part define an enclosed chamber 26.

Interposed between cap 24 and open end 25 of casing 22 is an annular sealing flange 30 of a bellows-like diaphragm 31. Diaphragm 31 is mounted for reciprocal movement within chamber 26 along the central axis of casing 22. Diaphragm 31 extends and retracts axially toward and away from wall portion 23, and divides chamber 26 into a first pressure chamber 32 and a second pressure chamber 33. Chamber 32 is disposed adjacent cap 24 and chamber 33 is disposed adjacent wall portion 23. A cup-shaped guide and signal element 34 is disposed within chamber 33 and is affixed to an end portion 35 of bellows 31 by a disc-like plate 36 having an axially projecting boss portion 37. Boss portion 37 includes a diametrically enlarged flange 37' which projects through a pair of cooperating apertures 38 and 39 formed in end portion 35 and an end portion 40 of the guide and signal element 34. Enlarged flange 37' has a snap engagement with end portion 40 and disc 36 is disposed to engage end portion 35 about the periphery of aperture 38 to effectively seal chamber section 32 from chamber section 33. With the above connection, diaphragm 31 and guide and signal element 34 are mounted for common movement, i.e. reciprocal movement along the central axis of casing 22 within chamber 26 from the position illustrated in FIG. 2 wherein signal element 34 is hidden from sight by the opaque skirt 28 of cap 24, and the position of FIG. 3 wherein guide and signal element 34 may be viewed through transparent casing 22. It should be noted that signal element 34 is preferably colored, with a color such as red, to make signal element 34 more readily visible through the peripheral wall 22' of casing 22.

Figure 2:
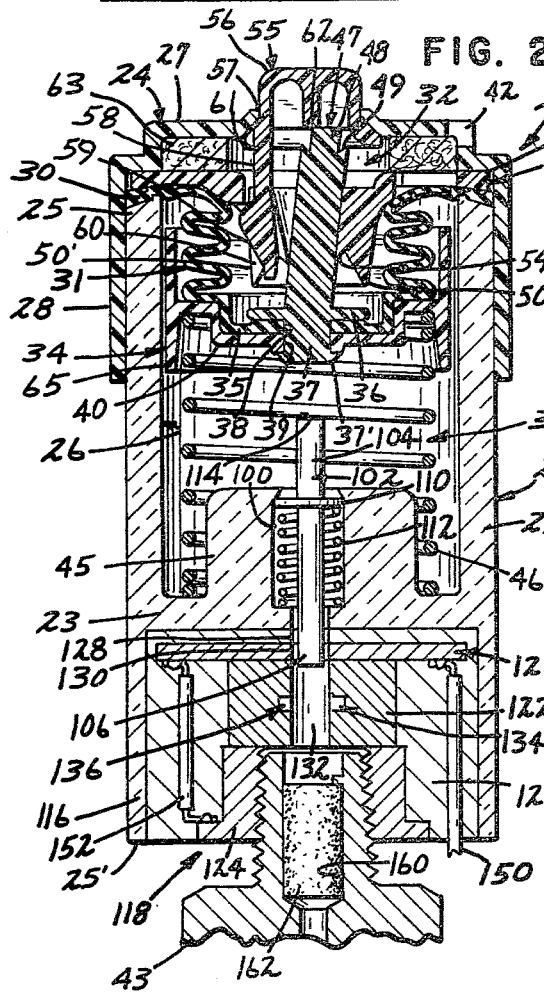
FIG. 2 is an enlarged view in vertical section as seen from the line 2—2 of FIG. 1 showing one embodiment of the present invention wherein the diaphragm member is in a retracted position.
Figure 3:
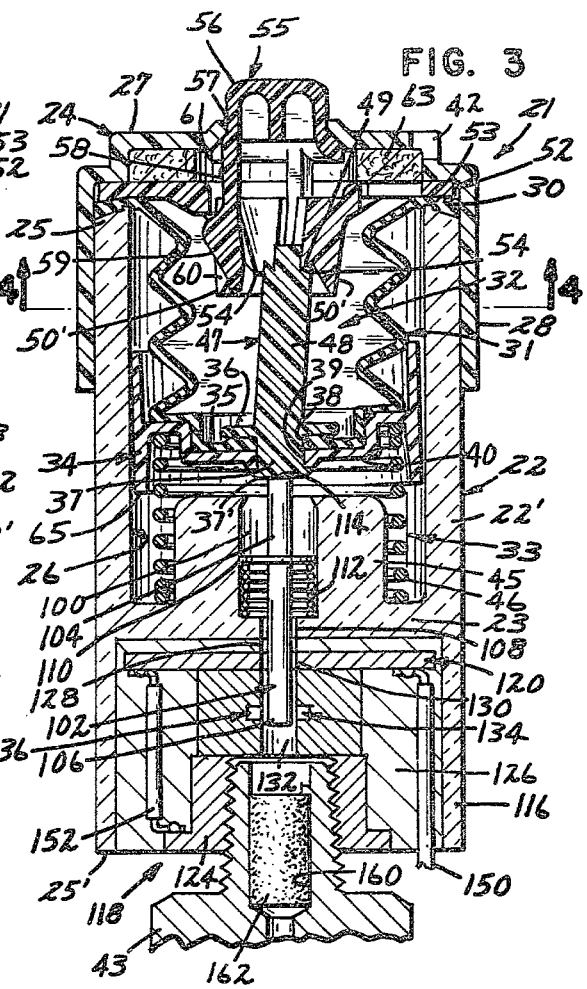
FIG. 3 is a view similar to FIG. 2 showing the diaphragm member in an extended position indicating increased negative pressure or fluid filter restriction.
Figure 4:
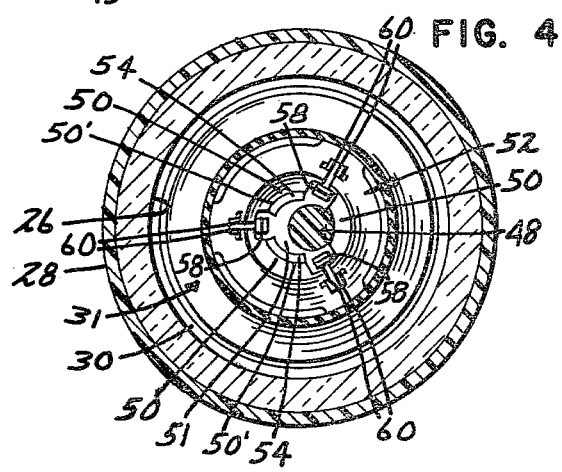
FIG. 4 is a view in horizontal section as seen from the line 4—4 of FIG. 3.
Figure 5:
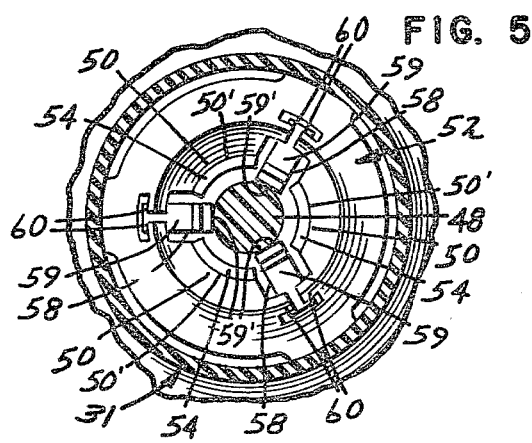
FIG. 5 is an enlarged view similar to FIG. 4 with portions thereof broken away.

Chamber 32 is vented to the atmosphere by means of apertures 42, one of which is shown, formed in top wall 27 and disposed circumferentially about cap 24. Chamber 33 is in fluid communication with negative pressure chamber 20 by means of a fitting 43 as will be described in more detail hereafter. Intermediate wall portion 23 has a boss portion 45 extending into chamber section 33. A coiled compression spring 46 is interposed between guide and signal element 34 and wall portion 23 of casing 22 with one end thereof disposed about boss 45. Spring 46 biases diaphragm 31 toward a retracted positioned as shown in FIG. 2 against the atmospheric pressure in chamber section 32 such that guide and signal element 34 is not visible through peripheral wall 22' of tubular casing 22 during normal unrestricted flow of air through filter 15. Such unrestricted flow, of course, provides a minimum of negative pressure within negative pressure chamber 20 and, consequently, atmospheric pressure in chamber 32 is insufficient to overcome the bias of spring 46. When the passage of air through filter element within housing 16 of filter 15 becomes sufficiently restricted, negative pressure within chamber 20 and chamber 33 will increase to a point where atmospheric pressure within chamber 32 will overcome the bias of compression spring 46 and diaphragm 31 will be forced to an extended position as shown in FIG. 3 wherein guide and signal element 34 is visible through peripheral wall 22' of casing 22. Thus, a visual indication that needed repairs to filter 15 is generated.

A recess 100 is provided in boss member 45 and is disposed along the central axis of casing 22. A switch rod 102 is disposed within recess 100 and has a first portion 104 which extends generally upward along the central axis of casing 22 into chamber 33. Switch rod 102 also has a second portion 106 extending generally axially downward through an aperture 108 formed in boss portion 45. A flange portion 110 is affixed to switch rod 102. A coil compression spring 112 is mounted within recess 100 engaging boss portion 45 about aperture 108 and in contact with the bottom surface of flange 110. Flange portion 110 and therefore switch rod 102 are biased upward by coiled spring 112. The top end 114 of rod 102 engages enlarged flange 37' of axially projecting boss portion 37 to move rod 102 downward as increasing negative pressure is supplied to chamber 33.

Tubular casing 22 has an annular skirt member 116 extending downwardly from wall portion 23. A contactless switch mechanism 118 is enclosed by annular skirt member 116. Switch mechanism 118 includes a printed circuit board 120, a photointerrupter 122, a fitting 124, and a mold member 126 in which circuit board 120, photointerrupter 122, and fitting 124 are imbedded. Fitting 124 is threaded internally and fitting 43 is secured by screw-threaded engagement to fitting 124. An aperture 128 is provided in mold member 126 and an aperture 130 is disposed in printed circuit board 120. Apertures 128 and 130 are aligned with each other and with aperture 108 in boss 45. A generally cylindrical axial passageway or chamber 132 is provided photointerrupter 122. Chamber 132 is aligned with apertures 108, 130, and 128 and switch rod 102 is mounted such that second portion 106 reciprocates axially within chamber 132 as will be described in more detail hereafter. Photointerrupter 122 includes a light emitting device 134 and a light receiving device 136 oppositely disposed along chamber 132 such that light emitted by device 134 will be received and detected by device 136 until second portion 106 of switch rod 102 blocks the transmission of light between devices 134 and 136 as illustrated in FIG. 3.

As shown in FIG. 6, printed circuit board 120 includes a board member 138 and mounted thereon, a thyrister 140, limiting resistors 142 and 144, a short circuit resistor 146, a zener diode 148, a positive lead wire 150 and a negative lead wire 152 for connecting printed circuit board 120 to an external power supply 154 and a display lamp 156 through a switch 158.

Fitting 124 has an axially aligned threaded passageway to receive brass fitting 43. Fitting 43 has an axial passageway 160 therethrough which communicates with chamber 132. A filter element 162 is disposed within axial passageway 160 and is typically formed of steel wool material.

FIG. 7 is a circuit schematic of the switch mechanism of the present invention. Power source 154, switch 158, and display lamp 156 are serially connected between lead wires 150 and 152. Thyristor 140 has an anode 164 connected to lead wire 150 at a junction point 166. Thyristor 140 has a cathode 168 connected to lead wire 152 and a gate 170 connected to a junction point 172. A resistor 146 is connected between junction point 172 and lead wire 152. Zener diode 148 has an anode 174 connected to junction point 172 and a cathode 178 which is connected to a collector 178 of light receiving element 136. Collector 178 of light receiving element 136 is also connected through resistor 144 to a junction point 180 that in turn is connected to junction point 166 by line 182. Light receiving element 136 has an emitter 184 which is connected to lead wire 152. Light emitting element 134 is, in the preferred embodiment, a light emitting diode having an anode 186 connected to junction point 180 and a cathode 188 connected through resistor 142 to lead wire 152. The operation of the circuit illustrated in FIG. 7 will be described in more detail hereafter.

FIGS. 4 and 5 and FIGS. 8-11 illustrate in more detail a means of assuring that a warning of filter restriction will be provided even though the engine with which the device is utilized may be inoperative or shut down. The means for assuring visual warning of filter restriction includes a means 47 adapted to maintain guide and signal element 34 in the warning position illustrated in FIG. 3 even though the negative pressure in chamber 20 and chamber 33 returns to the normal pressure of atmosphere during engine shutdown. Means 47 includes an elongated stem 48 formed integral with plate 36. Stem 48 projects axially from plate 36 in the direction of cap 24 on an axis that is slightly angularly disposed with respect to the axis of diaphragm 31. Means 47 further includes guide means in the nature of axially extending segments 50 which define a central opening 51 extending axially therethrough and having axially outer end portions adjacent cap 24 supported by means of a spider element 52. Spider element 52 has an outer peripheral edge 53 that is interposed between flange 30 of diaphragm 31 and cap 24 and supports segments 50 within chamber section 32 in axially spaced relationship to cap 24. Each segment 50 has projecting inner ends 50', each of which defines a latch means in the nature of latch dogs 54. It will be seen that as diaphragm 31 and warning device 34 move from the position of FIG. 2 wherein stem 48 is received through opening 51 to the warning position of FIG. 3, stem 48 engages one of segments 50 and is guided thereby to a point where it moves radially outward with respect to the axis of opening 51. This radially outward movement causes engagement between one of latch dogs 54 of segments 50 and a detent 49 of stem 48.

In order to reset restriction indicator 21 upon completion of any needed repairs or replacement of filter 15, there is provided an unlatching means 55. Unlatching means 55 terminates at its axially disposed outer end in a button 56 which is slidably received through an opening 57 formed centrally of top wall portion 27 of cap 24. A plurality of resilient circumferentially spaced fingers 58 project axially from button 56 into chamber section 32 and terminate adjacent inner ends 50' of segments 50 and substantially encompass stem 48. Fingers 58 each define adjacent their inner ends a radially outwardly facing cam surface 59. It will be noted, with particular reference to FIGS. 2-5, that segments 50 project axially of chamber section 32 and are disposed one each between adjacent ones of fingers 58 with the axially inner end portions 50' of segments 50 having cam surface forming portions 60 adjacent ones of which are adapted to engage cam surface 59 of an adjacent finger upon axially inward movement of button 56. As button 56 is moved axially toward stem 48, fingers 58 carried thereby are equally cammed radially inward by engagement of cam surfaces 59 thereon with cam forming portions 60 of segments 50. As the fingers move radially inward, inwardly facing cam surface 59' on fingers 58 engages stem 48 adjacent latch detent 49 and disengages detent 49 from the particular latch dog or dogs 54 with which it is engaged. Stem 48 is thus moved to a position wherein it is centered with respect to central opening 51, as seen particularly in FIGS. 4 and 5, and is engaged equally by all fingers 58. At this time the segments 50 are moved radially outward by the cam action of cam surfaces 59 of fingers 58 bearing against cam forming portions 60 of segments 50 with the result that central opening 51 is enlarged slightly to provide easy passage of stem 48 therethrough. Passage of stem 48 through opening 51 permits retracting movement of diaphragm 31 and movement of guide and signal element 34 to the position of FIG. 2 under the bias of coil spring 46 where the device is again ready to indicate a restriction in the repaired or replaced filter 15. Circumferentially spaced flange element 61 formed on the axially inner end of button 56 prevents axial outward displacement of button 56 and fingers 58 from the position of FIG. 2. Also, it will be noted that the extended end of stem 48 normally engages button 56 under the bias of coil spring 46, as at 62, when diaphragm 31 is in its retracted position. This permits the tightest possible seal between flange element 61 of button 56 and cap 24 to help exclude moisture or other contaminants from first chamber 32 during the retracted or generally normal position of FIG. 2.

An annular filter element 63, formed from Dacron fiber filter or the like, is interposed between cap 24 and spider 52 and serves to exclude moisture and/or dust which may enter first chamber 32 through apertures 42. It will be appreciated that such moisture, in the event of cold weather, would freeze. Otherwise, the moisture would serve to collect dust or dirt. In either event, normal operation of restriction indicator 21 would be impaired, thus rendering the device inoperable. Filters 63 and 162 provide means for effectively maintaining an operative condition of restriction indicator 21 during all extremities of environmental conditions.

It is further noted that the cup-shaped guide and signal element 34 is provided with an annular skirt portion 65 which forms an axial extension thereof. Consequently, cocking of signal element 34, such as illustrated in FIG. 3, does not cause signal element 34 to become wedged in chamber 26 rendering indicator 21 inoperative. With this combination of parts a visual restriction indicator 21 has been provided in which working parts of latching and unlatching means 47 and 55, respectively, are protected from damage due to heavily contaminated air and/or accidental impact.

The operation of device 21 will now be described with particular reference to FIGS. 2, 3, and 7. When the passage of air through filter element 15 becomes sufficiently restricted due to a buildup of filtered contaminants, increased negative pressure is generated within chamber 20. This negative pressure is applied to chamber 33 through axial passageway 160, chamber 132 and recess 100. Chamber 32 communicates with the atmosphere through aperture 42 formed in cap 24 and filter element 63. The atmospheric pressure will become sufficient to overcome the bias of compression spring 46 and diaphragm 31 will be forced to the extended position shown in FIG. 3 whereby signal and indicator element 34 is lowered to a position wherein it is visible through peripheral wall 22' of casing 22 thus providing a visual indication that needed repairs or replacement of the fluid filter should be effected. As illustrated in FIG. 3, under restricted conditions, second portion 106 of switch rod 102 interrupts the passage of light between light emitting device 134 and light receiving device 136. The atmospheric pressure within chamber 32 which causes diaphragm 31 to move downward against the biasing force of spring 46 causes boss portion 37 to engage top end 114 of switch rod 102. Switch rod 102 is thereby urged downward into the light interrupting position shown in FIG. 3 against the biasing force of compression spring 112.

Referring to FIG. 7, when switch 158 is closed current flows from power source 154 to junction point 166 through display lamp 156. Under non-alarm conditions thyristor 140 is non-conductive. Therefore, there is no current flow through cathode 168. The current under non-alarm conditions flows through light emitting device 134 and light receiving device 136. Limiting resistors 142 and 144 cause the current to be minimal and insufficient to illuminate display lamp 156.

Light receiving element 136 functions to control the gate current of thyristor 140. When light is incident upon light receiving element 136, the collector to emitter resistance is low and consequently the voltage at collector 178 is small. With the voltage at collector 178 small, zener diode 148 is substantially non conducting, allowing only a minute current flow therethrough. The collector to emitter resistance of light receiving element 136 increases significantly upon interruption of the light impinging upon it. This occurs when second portion 106 of switch rod 102 is placed between light emitting element 134 and light receiving element 136. When the collector to emitter resistance goes high, the voltage on collector 178 increases significantly thereby increasing the voltage applied to cathode 176 of zener diode 148. Increased voltage at cathode 176 causes zener diode 148 to avalanche break down resulting in a sudden increase of current flow therethrough. The current flowing to gate 170 of thyristor 140 thus increases. Thyristor 140 is turned on causing current flow from anode 164 to cathode 168 of thyristor 140. Once anode 164 begins to conduct, thyristor 140 is held in conduction even though the current on gate 170 would reduce to zero. Display lamp 156 is illuminated by increased current flow therethrough and will not be extinguished until switch 158 is opened. Resistor 146 is provided between gate 170 and lead wire 152 to protect thyristor 140 against excessive currents. Display lamp 156 will remain illuminated regardless of the upward and downward reciprocal movement of switch rod 102. As previously described, to reset device 21 the button 56 is pushed downward causing stem 48 to return to the position shown in FIG. 2. Power switch 158 is opened, extinguishing display lamp 156. It is apparent, therefore, that dual signal means for indicating a restriction is provided by virtue of the visual observance of signal element 34 and the electronic indication provided by display lamp 156.

An alternative embodiment of the present invention is illustrated in FIG. 12. In the alternative embodiment, switch rod 102' is affixed directly to a cup-shaped member 190 and intermediate portion 35' of diaphragm 31'. Diaphragm 31' and cup-shaped member 190 are mounted for reciprocal movement axially and diaphragm 31' divides the interior of tubular casing 22a into an upper chamber 32' which is vented to the atmosphere through aperture 42' and a lower chamber 33' which is in fluid communication with a negative pressure chamber 20'. Cup-shaped member 190 and diaphragm 31' are biased upward by a compression spring 46' such that the transmission of light between light emitting device 134' and light receiving device 136' is uninterrupted. Contactless switch mechanism 118' has identical elements and the relationship thereof is the same as in the embodiment illustrated in FIGS. 2, 3, 6 and 7. The alternative embodiment shown in FIG. 12 also differs from the first embodiment in that there is no provision in the embodiment of FIG. 12 for maintaining diaphragm 31' and cup-shaped member 190 in the warning position regardless of the pressure within chamber 20'. The embodiment of FIG. 12 functions identically with the first embodiment in that as the negative pressure within chamber 20' increases the atmospheric pressure within chamber 32' is sufficient to depress diaphragm 31' and cup-shaped member 190 downward whereby rod 102' interrupts the light transmission path between light emitting device 134' and light receiving device 136'. As previously described, a visual signal is provided by the illumination of display lamp 156. In the alternative embodiment tubular casing 22a may be opaque and thus provision for visual detection of restriction other than by means of lamp 156 is not provided. It will be understood that an alarm bell or buzzer could be utilized in either embodiment in place of or in addition to display lamp 156.

From the above description it is apparent that the present invention is an improved restriction indicator and alarm using a switch mechanism that eliminates the problem associated with mechanical contacts. The present invention thus provides an accurate alarm signal indication under a wide range of environmental conditions, in particular in applications wherein the device is frequently subject to violet vibrations. In one embodiment, the contactless switch mechanism is incorporated into a device which also provides a second visual warning indication and which may be locked in the warning position to insure that the warning signal is detected.

What is claimed is:

1. A restriction indicator for fluid filters having an intake side and a negative pressure side comprising:
   (a) a housing having top and bottom ends and a continuous side wall therebetween;
   (b) a flexible bellows-like diaphragm member affixed within said housing and dividing the interior of said housing into first and second pressure chambers, said housing having an aperture in the top end thereof providing fluid communication between said first chamber and the atmosphere and an aperture in the bottom end thereof providing fluid communication between said second chamber and the negative pressure side of the fluid filter, said diaphragm member mounted for extending and retracting movement toward and away from said top end of said housing in response to negative pressure within said second chamber;
   (c) spring means for biasing said diaphragm member toward said top end of said housing;
   (d) means for providing an electrical signal indicative of negative pressure within said second chamber, said indicating means comprising:
      (i) a photointerrupter affixed to said housing at one of said top and bottom ends thereof, said photointerrupter having an axial passageway therethrough, a light receiving means and a light generating means disposed at diametrically opposed positions about said axial passageway so that light generated by said light generating means is transmitted across said axial passageway and detected by said light receiving means;
      (ii) a rod disposed for axial reciprocating movement within said axial passageway to selectively interrupt transmission of light across said axial passageway;
      (iii) means for biasing said rod toward a first axial position wherein light transmission in uninterrupted;
      (iv) means for transmitting said expanding movement of said diaphragm to said rod whereby said rod is urged toward a second position interrupting light transmission across said axial passageway; and
      (v) electric circuit means connected to said light transmitting means and said light receiving means for providing an electrical signal corresponding to presence or absence of increased negative pressure within said second chamber.

2. A restriction indicator in accordance with claim 1 wherein said light generating means is a light emitting diode and said light receiving means is a device having a collector and emitter and a collector to emitter resistance dependent upon the presence or absence of light impinging on said device.

3. A restriction indicator in accordance with claim 2 wherein said electric circuit means comprises:
   (a) a source of power and an indicating device connected in series between a positive and a negative lead conductor, said light emitting diode having an anode connected to said positive lead conductor and a cathode connected to said negative lead conductor, said collector of said light receiving device connected to said positive lead conductor and said emitter of said light receiving device connected to said negative lead conductor;
   (b) a thyristor having an anode connected to said positive lead conductor, a cathode connected to said negative lead conductor, and a gate;

(c) a zener diode having an anode connected to said gate of said thyristor, and a cathode connected to said collector of said light receiving device; and (d) whereby upon interruption of light transmission by said rod said light receiving device generates a voltage signal on said collector thereof, said voltage signal causing increased current flow through said zener diode thereby turning thyristor on actuating said indicating device.

4. A restriction indicator in accordance with claim 1 wherein said rod has a first end extending into said second chamber and said diaphragm member has a contact surface thereon which engages said first end upon expansion of said diaphragm urging said rod downward into a light interrupting position.

5. A restriction indicator in accordance with claim 4 comprising means within said first chamber for releasably retaining said diaphragm member in said extended position, said retaining means further comprising:

(a) an elongated generally axial stem secured to said diaphragm and extending in the direction of said top end of said housing on an axis slightly angularly disposed with respect to the axis of said diaphragm member;

(b) said stem having an axially outer portion which defines latch means;

(c) axially extended guide means within said first chamber defining an axially extended opening therethrough inwardly of said top end for said stem and having an axially inner end portion which defines latch means adapted to cooperate with said latch means defined by said stem to maintain said diaphragm in the extended position thereof, the axially outer portion of said stem slidably engaging said opening end of said guide means;

(d) unlatching means for said stem carried by and cooperating with said guide means, said unlatching means terminating in a button at its axially outer end which projects slidably through a central opening provided in said top end of said housing;

(e) said unlatching means further including a plurality of circumferentially spaced fingers defined by the axially inner end thereof, said fingers defining cam surfaces which engage and center said stem with respect to said guide means and which cooperate with cam surfaces defined by said guide means to cause simultaneous radially inward stem centering movements of said fingers upon axial inward movement of said button.

6. A restriction indicator in accordance with claim 5 wherein said guide means is formed to define axially elongated resilient segments which extend circumferentially between said fingers and which are formed at their axially inner ends with cooperating portions which define said cam surfaces.

7. A restriction indicator for fluid filters having an intake side and a negative pressure side comprising:

(a) a housing having first and second ends and a side wall defining an enclosed interior;

(b) a flexible bellows diaphragm member affixed within said housing and disposed generally transversely with respect to a central longitudinal axis of said housing, said diaphragm member mounted for extending and retracting movement toward and away from said first end and dividing said enclosed interior of said housing into first and second pressure chambers, said first end of said housing having an aperture therein providing fluid communication between said first chamber and the atmosphere, said housing also having an aperture in said second end thereof providing fluid communication between said second chamber and the negative pressure side of the fluid filter;

(c) a photointerrupter affixed to one of said first and second ends of said housing and having an axial passageway therethrough, said axial passageway aligned with said aperture in said one of said first and second ends of said housing, said photointerrupter having a light receiving means and a light generating means disposed at diametrically opposed positions about said axial passageways so that light generated by said light generating means is transmitted across said axial passageway and detected by said light receiving means;

(d) a rod member affixed to said diaphragm and extending through said aperture in said one of said first and second ends of said housing into said axial passageway, said rod member mounted for reciprocal movement within said axial passageway to selectively interrupt light transmission between said light generating means and light receiving means;

(e) spring means for biasing said flexible bellows-like diaphragm member toward a first position whereby said rod is positioned such that light transmission is uninterrupted; and (f) electric circuit means connected to said light transmitting means and light receiving means for providing an electrical signal corresponding to presence or absence of increased negative pressure within said second chamber.

8. A restriction indicator in accordance with claim 7 wherein said light transmitting means is a light emitting diode and said light receiving means is a device having a collector and an emitter, and a collector to emitter resistance dependent upon the presence or absence of light impinging on said device.

9. A restriction indicator in accordance with claim 8 wherein said electric circuit means comprises:

(a) a source of power and an indicating device connected in series between a positive and a negative lead conductor, said light emitting diode having an anode connected to said positive lead conductor and a cathode connected to said negative lead conductor, said collector of said light receiving device connected to said positive lead conductor and said emitter of said light receiving device connected to said negative lead conductor;

(b) a thyristor having an anode connected to said positive lead conductor, a cathode connected to said negative lead conductor, and a gate;

(c) a zener diode having an anode connected to said gate of said thyristor, and a cathode connected to said collector of said light receiving device; and (d) whereby upon interruption of light transmission said light receiving device generates an output signal on said collector thereof, said output signal serving to increase conduction through said zener diode thereby turning on said thyristor such that said indicating device is actuated in response to increased negative pressure within said second chamber.

10. A restriction indicator for fluid filters having an intake side and a negative pressure side comprising:

(a) a tubular housing having a top open end and bottom end with an aperture therein, and a peripheral wall which defines a window means proximate said top end;

(b) a cap having a central opening closing said top end of said housing and cooperating with said housing to define an enclosed interior;

(c) a bellows-like diaphragm extending transversely of said enclosed interior for extending and retracting movements therein toward and away from said top end, said diaphragm dividing said enclosed interior into first and second pressure chambers proximate said top and said bottom ends, respectively;

(d) said cap having an aperture therein providing fluid communication between said first chamber section and the atmosphere, said aperture in said bottom end of said housing providing fluid communication betwen second chamber and the negative pressure side of the fluid filter;

(e) a cup-shaped guide and signal element within said second chamber;

(f) means securing said guide and signal element to said diaphragm for common movements therewith, said guide and signal element visible through said window means when said diaphragm is in an extended position;

(g) means for detachably connecting said bottom end of said housing to the negative pressure side of the fluid filter to provide communication between said negative pressure side and said second chamber;

(h) a biasing spring interposed between said cup-shaped guide and signal element and said bottom end of said housing, said spring maintaining said diaphragm in a retracted position against atmospheric pressure in said first chamber, and simultaneously retaining guide and signal element in a position where it is not visible through said window means, but permitting extending movement of said bellows diaphragm against the bias thereof when a predetermined increase of negative pressure occurs within said second chamber;

(i) means for providing an electrical signal indicative of increased negative pressure within said second chamber, said indicating means comprising:
  (1) a photointerrupter affixed to said housing at said bottom end thereof, said photointerrupter having an axial passageway therethrough, a light receiving means and a light generating means disposed at diametrically opposed positions about said axial passageways so that light generated by said light generating means is transmitted across said axial passageway and detected by said light receiving means;
  (2) a rod disposed for axial reciprocating movement within said axial passageway to selectively interrupt the transmission of light across said axial passageway;
  (3) spring means for biasing said rod toward a first axial position wherein light transmission is uninterrupted;
  (4) said rod having a first end extending upward into said second chamber and said diaphragm having a contact surface thereon which engages said first end upon extension of said diaphragm thereby urging said rod downward into a light interrupting position within said axial passageway; and
  (5) electric circuit means connected to light transmitting means and said light receiving means for providing an electrical signal corresponding to presence or absence of increased negative pressure within said second chamber.

11. A restriction indicator in accordance with claim 10 comprising means within said first chamber for releasably retaining said diaphragm in said extended position, said retaining means comprising:
  (a) an elongated stem secured to and carried by said diaphragm and extending in the direction of said cap on an axis slightly angularly disposed with respect to the axis of said diaphragm;
  (b) said stem having an axially outer portion which defines latch means;
  (c) axially extended guide means in said first chamber defining an axially extended opening therethrough inward of said cap for said stem and having an axially inner end portion which defines latch means adapted to cooperate with said latch means defined by said stem to maintain said bellows to said extended position, said axially outer portion of said stem slidably engaging one side of said axially extended opening;
  (d) unlatching means for said stem carried by and cooperating with said guide means, said unlatching means terminating in a button at its axially extended outer end which projects slidably through a central opening in said cap, said button having a portion normally engaging said cap adjacent said central opening to close said central opening; and
  (e) said unlatching means further including a plurality of circumferentially spaced resilient fingers defined by the axially inner end thereof, said fingers defining cam surfaces which engage and center said stem with respect to said guide means and which cooperate with cam surfaces defined by said guide means to cause simultaneous radially inward stem centering movements of said fingers upon axial inward movement of said button.

12. A restriction indicator in accordance with claim 11 wherein said light transmitting means is a light emitting diode and said light receiving means is a device having a collector and emitter and a collector to emitter resistance that is a function of the presence or absence of light impinging on said device.

13. A restriction indicator in accordance with claim 12 wherein said electric circuit means comprises:
  (a) a source of power and an indicating device connected in series between a positive and a negative lead conductor, said light emitting diode having an anode connected to said positive lead conductor and a cathode connected to said negative lead conductor, said collector of said light receiving device connected to said positive lead conductor and said emitter of said light receiving device connected to said negative lead conductor;
  (b) a thyristor having an anode connected to the positive lead conductor, a cathode connected to said negative lead conductor and a gate;
  (c) a zener diode having an anode connected to said gate and a cathode connected to said collector of said light receiving device.

14. A restriction indicator in accordance with claim 13 in which said guide means is formed to define axially elongated resilient segments which extend circumferentially between said fingers, and which are formed at their axially inner ends with cooperating portions which define cam surfaces.

15. A restriction indicator in accordance with claim 14 wherein said axially inward movements of said button cause radially outward movements of said segments whereby said axially extended opening in said guide means is slightly diametrically enlarged.

* * * * *

UNITED STATES PATENT AND TRADEMARK OFFICE
CERTIFICATE OF CORRECTION

PATENT NO. : 4,189,724

DATED : February 19, 1980

INVENTOR(S) : Minoru Onuma, Masayoshi Nakamura, Takao Yamazaki, and Tatsuo Ohta

It is certified that error appears in the above-identified patent and that said Letters Patent are hereby corrected as shown below:

Column 1, line 67, delete the word "arm" and insert the word --alarm--.

Column 11, line 38, after "axially" insert --extended--

Column 13, line 17, delete the word "betwen" and insert therefor --between--.

Column 14, line 17, in the second instance of the use of the word "to", cancel "to" and insert therefor --in--.

Signed and Sealed this

Tenth Day of June 1980

[SEAL]

Attest:

SIDNEY A. DIAMOND

Attesting Officer

Commissioner of Patents and Trademarks